United States Patent [19]

Sato et al.

[11] Patent Number: 5,540,083

[45] Date of Patent: Jul. 30, 1996

[54] LEAKAGE MEASURING APPARATUS

[75] Inventors: Takao Sato; Kenji Haga, both of Aichi-ken, Japan

[73] Assignee: Toyoda Gosei Co., Ltd., Aichi-ken, Japan

[21] Appl. No.: 359,829

[22] Filed: Dec. 20, 1994

[30] Foreign Application Priority Data

Dec. 22, 1993 [JP] Japan .................................. 5-323868

[51] Int. Cl.$^6$ .............................. G01N 7/00; G01M 3/04; G01M 3/26
[52] U.S. Cl. .................................. 73/40.000; 73/49.100; 73/40.500 R
[58] Field of Search .............................. 73/40, 49.1, 49.2, 73/40.5 R

[56] References Cited

U.S. PATENT DOCUMENTS

| | | | |
|---|---|---|---|
| 4,590,793 | 5/1986 | Staats, Jr. ...................... | 73/40.0 |
| 4,621,520 | 11/1986 | Schwarz et al. ................ | 73/40 |
| 4,715,214 | 12/1987 | Tveter et al. .................. | 73/49.2 |
| 4,765,325 | 8/1988 | Crutchfield .................... | 128/202.13 |
| 4,811,252 | 3/1989 | Furuse ........................... | 364/556 |
| 4,918,968 | 4/1990 | Hoffman ......................... | 73/40 |
| 5,083,451 | 1/1992 | Kling ............................. | 73/49.02 |
| 5,152,167 | 10/1992 | Moody ............................ | 73/40 |
| 5,201,213 | 4/1993 | Henning ......................... | 73/49.2 |
| 5,347,848 | 9/1994 | Schoeffel et al. ............. | 73/37 |
| 5,367,797 | 11/1994 | Zaim ............................... | 73/49.2 |

FOREIGN PATENT DOCUMENTS 55-63732  5/1980  Japan .

Primary Examiner—Hezron E. Williams
Assistant Examiner—J. David Wiggins
Attorney, Agent, or Firm—Cushman Darby & Cushman, L.L.P.

[57] ABSTRACT

A leakage measuring apparatus for detecting a minute amount of leakage of a sealing valve in a short time with high sensitivity, provided with a first pressure supply device for applying the same pressure to a first fluidic circuit and a test connection port to be connected with a sealing valve under leakage measurement, and to a second fluidic circuit serving as the reference and a reference connection port. First and second electromagnetic valves cut off the communication of the fluidic circuits to the first pressure supply device while the first and second fluidic circuits are under the applied pressure. A pressure sensor detects the pressure of the first fluidic circuit. A second pressure supply device supplies fluid to the first fluidic circuit and the same amount of fluid to the second fluidic circuit in order to maintain the pressure in the first fluidic circuit at the applied pressure on the basis of the detected pressure of the pressure sensor. A differential pressure sensor senses a differential pressure between the fluid pressures of the two fluidic circuits, thereby measuring the amount of leakage from the sealing valve quickly and accurately on the basis of the detected differential pressure.

7 Claims, 4 Drawing Sheets

LEAKAGE MEASURING APPARATUS

The priority application, Japanese Patent Application No. 05-323868, filed in Japan on Dec. 22, 1993 is hereby incorporated into the present specification by this reference.

BACKGROUND OF THE INVENTION

1. Field of the Invention

This invention relates to a leakage measuring apparatus which determines whether there is a leak in a vessel or parts which are required to be air-tight.

2. Description of Related Art

An example of conventional art of this type of leakage measuring apparatus is disclosed in JP-A-55-63732.

The apparatus described in the above-mentioned Japanese Patent Application comprises means for applying the same fluid pressure to both an object to be measured and a reference tank, a differential pressure sensor for detecting a differential pressure between the object to be measured and the reference tank, a capacity variable portion communicating with the object, and control means for controlling the capacity variable portion so as to reduce the differential pressure to zero in response to output of the differential pressure sensor, wherein the amount of leakage of the object under leak test is measured regardless of the inner volume of the object, a difference in the internal pressures of the object and the reference tank is measured, and then the control means adjusts the capacity of the capacity variable portion to reduce the differential pressure to zero. The amount of leakage is generally very little and the capacity of the capacity varying portion may be small, so that the whole apparatus can be reduced in size. Other features of this apparatus are that the apparatus can be formed in a robust manner, and that the operation is made stable by use of feedback control by detecting the differential pressure and adjusting the capacity of the capacity variable portion to reduce the differential pressure to zero.

However, the principle of the conventional leakage measuring apparatus is applying the same fluid pressure to both the object under leak test and the reference tank, detecting the differential pressure between the object and the reference tank with an electric signal through a differential pressure detector, and determining the displacement of the piston (capacity variable portion) on the test fluidic circuit side so as to estimate the leakage. In an actual measurement of leakage, the leakage from the object under test is usually small and the volumetric change may be extremely small, so that errors in measurement of the piston displacement must be minimized for accurate measurement of the leakage. Particularly, when leakage of the object is very small, a long time is required for measurement of leakage in the object, that is, the inspection efficiency is low. In order to increase the displacement of the piston relative to the amount of leakage, it is necessary to reduce the diameter and increase the length of the piston, but manufacturing such a piston is difficult.

The above conventional apparatus has an undesirable time lag although a differential pressure sensor controls the piston communicating with the object under test, and a low signal-to-noise ratio owing to the effects of the distortion in the object to be measured and the reference tank derived from the applied pressure. Thus with the conventional apparatus, the accuracy of measurement is not sufficient.

SUMMARY OF THE INVENTION

An object of the present invention is to provide a leakage measuring apparatus which is capable of detecting a minute leak in a short period of time with improved measurement accuracy.

A leakage measuring apparatus according to the present invention comprises valve means capable opening and closing to supply or stop fluid communication with a test fluidic circuit and a reference fluidic circuit independently of each other. The fluid is supplied from first pressure supply means supplying fluid at the same fluid pressure to the test fluidic circuit to which an object under leak measurement is connected and the reference fluidic circuit. Pressure detecting means detects the fluid pressure in the test fluidic circuit. Second pressure supply means supplies the fluid to the test fluidic circuit to maintain the fluid pressure in the test fluidic circuit at a specified value and also supplies the same amount of fluid, as the amount supplied to the test fluidic circuit, to the reference fluidic circuit. Differential pressure detecting means detects a differential pressure between the test fluidic circuit and the reference fluidic circuit.

In the present invention, the same fluid pressure is applied by the first pressure supply means to the test fluidic circuit to which the object to be measured is connected and also to the reference fluidic circuit. The valve means then cuts-off the communication of both the fluidic circuits with the first pressure supply means independently of each other when fluid pressure is applied to the fluidic circuits. Pressure detecting means detects the fluid pressure in the test fluidic circuit, and the second pressure supply means supplies the fluid to the test fluidic circuit according to the detected value of the pressure detecting means so as to maintain the fluid pressure in the test fluidic circuit at a specified value. At the same time, the same amount of fluid as the amount of fluid supplied to the test fluidic circuit is also supplied to the reference fluidic circuit. Then, a differential pressure between the test fluidic circuit and the reference fluidic circuit is detected by the differential pressure detecting means, as the differential pressure corresponds to the leakage of the test object.

The leakage measuring apparatus according to the present invention maintains the pressure in the test fluidic circuit at a constant level by implementing feedback control of the pressure supply device so as to compensate for a pressure drop resulting from the leak from the object to be measured and, at the same time, supplies the same amount of fluid to the reference fluidic circuit and detects a pressure rise with a high-sensitivity differential pressure sensor. By estimating the amount of leakage from the differential pressure signal, the amount of leakage can be detected with high accuracy in a short time.

DESCRIPTION OF THE PREFERRED EMBODIMENTS

Figure 1:
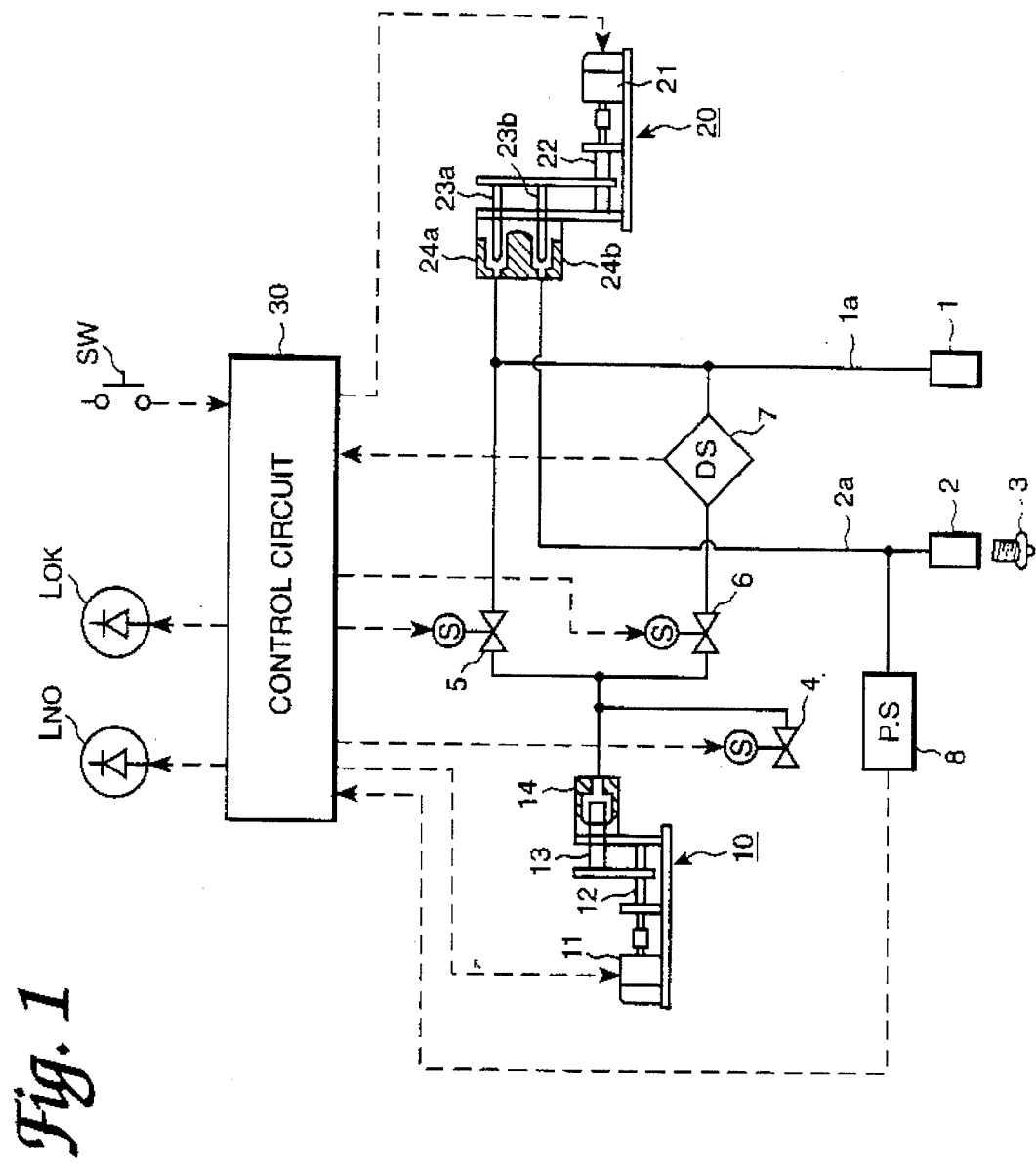
FIG. 1 is a general circuit diagram of the leakage measuring apparatus according to an embodiment of the present invention.

In FIG. 1, a reference connection port 1 and a test connection port 2 are furnished with the same type of connector, and the test connection port 2 is used to sealingly receive a sealing valve 3 of the same type to be tested, which is screwed therein. In order to maintain a good sealing condition, the sealing valve 3 is fixed by depositing or welding. The test connection port 2 is to be threadedly engaged with the sealing valve 3, as a test piece, to make a determination regarding the condition of seal of the sealing valve 3. An electromagnetic valve 4 is controlled so as to open when air is charged into the first pressure supply means 10, which will be described below, and to close when pressure is supplied from the first pressure supply means 10 to the reference connection port 1 and the test connection port 2. Electromagnetic valves 5 and 6 are controlled so as to open when pressure is supplied to the reference connection port 1 and the test connection port 2 from the first pressure supply means 10, and to close when the sealing valve 3, as a test piece, is screwed into the test connection port 2 and a sealing test is under way. A differential pressure sensor 7 for sensing a pressure difference between the test fluidic circuit 2a and the reference fluidic circuit 1a is connected between a test fluidic circuit 2a, comprising a pipe line connecting the electromagnetic valve 6 and the test connection port 2, and the reference fluidic circuit 1a comprising a pipe line connecting the electromagnetic valve 5 and the reference connection port 1. In addition, a pressure sensor 8 is connected to the test fluidic circuit 2a.

The first pressure supply means 10 comprises a stepping motor 11, a ball screw 12 directly connected to the stepping motor 11, a piston 13 which reciprocates as the ball screw 12 rotates, and a cylinder 14 whose capacity is varied by the piston 13. The cylinder 14 is connected to the atmosphere via the electromagnetic valve 4, and is also connected to the test connection port 2 through the electromagnetic valve 6.

Therefore, in the first pressure supply means 10, as the stepping motor 11 rotates, the ball screw 12 rotates, causing the piston 13 to reciprocate, and by the reciprocating motion of the piston 13, the capacity of the cylinder 14 is varied. For example, by the clockwise rotation of the stepping motor 11, the capacity of the cylinder 14 increases, and by the counter-clockwise rotation of the stepping motor 11, the capacity of the cylinder 14 decreases. If the electromagnetic valve 4 is open and the electromagnetic valves 5 and 6 are closed, atmospheric air is conducted into the cylinder 14 of increased capacity. If the electromagnetic valve 4 is closed and the electromagnetic valves 5 and 6 are open, the fluid compressed by the of the cylinder 14 of decreased capacity is supplied to the reference connection port 1 and the test connection port 2.

The second pressure supply means 20 comprises a stepping motor 21, a ball screw 22 directly connected to the stepping motor 21, pistons 23a and 23b which simultaneously reciprocate by the rotation of the ball screw 22, and cylinders 24a and 24b, the capacities of which are varied equally by the pistons 23a and 23b. The first cylinder 24a is connected to the reference fluidic circuit 1a including the electromagnetic valve 5 and the reference connection port 1, while the second cylinder 24b is connected to the test fluidic circuit 2a including the electromagnetic valve 6 and the test connection port 2.

Therefore, in the second pressure supply means 20, as the stepping motor 21 rotates, the ball screw 22 is rotated, and by the rotation of the ball screw 22, the pistons 23a and 23b are made to reciprocate simultaneously. As the pistons 23a and 23b reciprocate, the capacities of the cylinders 24a and 24b are varied simultaneously with equal volume. For example, by rotating the stepping motor 21 clockwise, the capacities of the cylinders 24a and 24b are increased, and by rotating the stepping motor 21 counter-clockwise, the capacities of the cylinders 24a and 24b are decreased. If the electromagnetic valves 4, 5 and 6 are open, atmospheric air is conducted into the increasing capacities of the cylinders 24a and 24b. If the electromagnetic valves 5 and 6 are closed, the fluid compressed by the decreasing capacities of the cylinders 24a and 24b is supplied simultaneously to the reference connection port 1 and the test connection port 2.

The control circuit 30 includes a microcomputer, and receives outputs of the differential pressure sensor 7 and the pressure sensor 8, and also receives on/off signals of the start switch SW. Connected to the output side of the control circuit 30 are the stepping motor 11 of the first pressure supply means 10, the stepping motor 21 of the second pressure supply means 20, the electromagnetic valves 4, 5 and 6, an LED indicator LNO for displaying a "defective" condition when the amount of leakage exceeds a specified threshold value, and an LED indicator LOK for displaying a "proper" condition when the amount of leakage is under a specified value.

Figure 2:
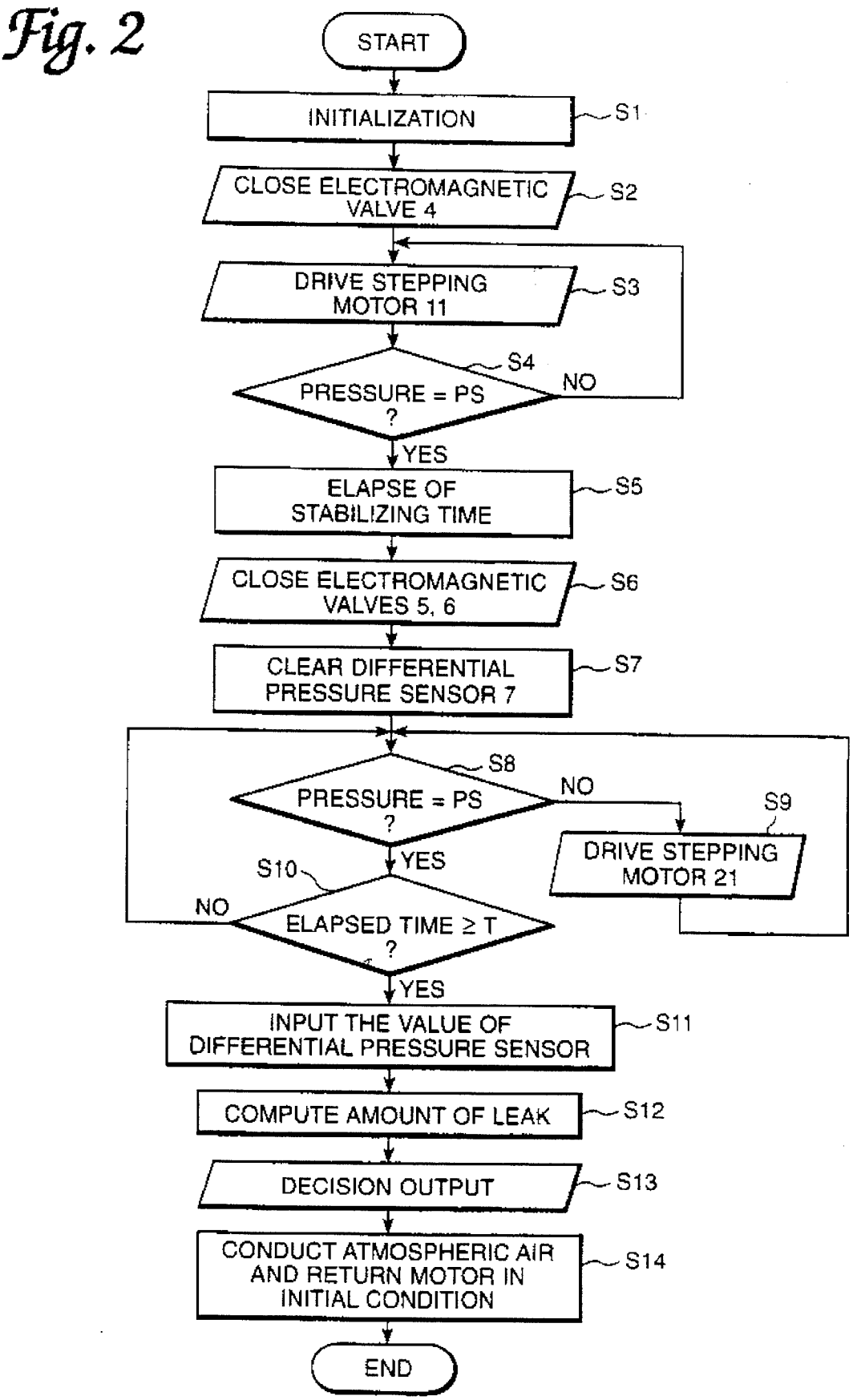
FIG. 2 is a flowchart of program control of the leakage measuring apparatus according to the embodiment of the present invention.

Description will next be made of program control of the leakage measuring apparatus according to this embodiment, with reference to FIG. 2.

The routine starts when the start switch SW is turned on under the condition that the test connection port 2 has a sealing valve 3 to be measured screwed therein.

At step S1, an initialization step is performed to reset the pressure sensor 8, and to carry-out "zero" calibration.

At step S2, the electromagnetic valve 4 is closed. At steps S3 and S4, observing the detected value of the pressure sensor 8, the inner volume of the cylinder 14 is decreased by the counter-clockwise rotation of the stepping motor 11 of the first pressure supply means 10, and the compressed fluid is supplied to the reference fluidic circuit 1a and the reference connection port 1, on one side, and to the test fluidic circuit 2a and the test connection port 2, on the other side, so as to increase the pressure until a specified pressure Ps is reached. At step S5, a stabilizing waiting period is established, sufficient to remove the fluidic distortion when the detected value of the pressure sensor 8 reaches the specified pressure of Ps (see FIG. 3), and at step S6 the electromagnetic valves 5 and 6 are closed, thereby making independent the reference fluidic circuit 1a and the reference connection port 1, on one hand, and the test fluidic circuit 2a and the test connection port 2, on the other hand. In order to determine whether there is no difference in pressure between the two circuits at this time, at step S7 the differential pressure sensor 7 is reset and its "zero" calibration is performed.

Figure 3:
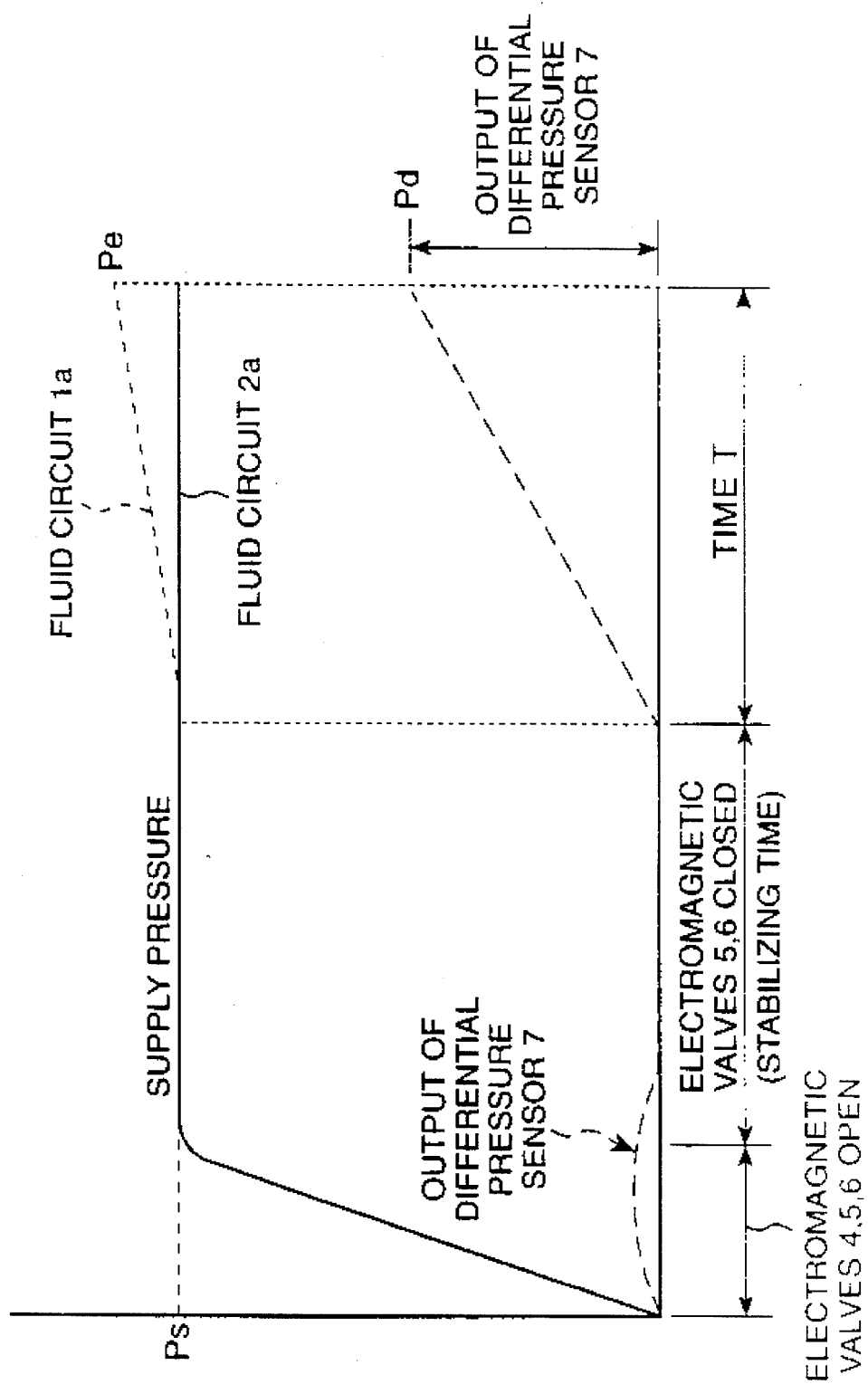
FIG. 3 is a characteristic diagram showing the timing of control of the leakage measuring apparatus according to the embodiment of the present invention.

At steps S8 to S10, a decision is continuously made whether or not the detected value of the pressure sensor 8 exceeds the specified pressure Ps until the specified elapsed time for the test passes the predetermined test time T. If the detected pressure is found to be decreased, at step S9 the counter-clockwise rotation of the stepping motor 21 of the second pressure supply means 20 reduces the inner volumes of the cylinders 24a and 24b and the fluid compressed in the cylinders 24a and 24b is supplied simultaneously to the reference fluidic circuit including the fluidic circuit 1a and the reference connection port 1, and also to the test fluidic circuit including the fluidic circuit 2a and the test connection port 2. In other words, in order that the detected value of the pressure sensor 8 is maintained equal to the specified pressure Ps until the specified test time T passes, the stepping motor 21 of the second pressure supply means 20 is rotated counter-clockwise to reduce the inner volume of the cylinder 24b, thereby maintaining the internal pressure of the test fluidic circuit including the fluidic circuit 2a and the test connection port 2 always at the pressure of Ps. When the same amount of air as the amount supplied to keep the test fluidic circuit at the pressure of Ps at all times is supplied to the reference fluidic circuit, its internal pressure is raised above the specified pressure of Ps and eventually to a pressure of Pe as shown in FIG. 3.

At step S11 the detected value of the differential pressure sensor 7 is read in, and at step S12 arithmetic operations are performed.

The arithmetic operations are as follows. If the inner volume of the reference fluidic circuit including the fluidic circuit 1a and the reference connection port 1 is substantially equal to the inner volume of the test fluidic circuit including the fluidic circuit 2a and the test connection port 2, the inner volume of the reference fluidic circuit is denoted by Vs, the amount of leakage measured during the test time T is denoted by L, the actual amount of leakage during the test time T is denoted by "Leak", the compressed volume due to disturbances is denoted by v, and the differential pressure detected by the differential pressure sensor 7 is denoted by Pd, then:

$$Ps \cdot Vs = Pe(Vs - L - V)$$

$$\text{Leak} = v + L = Vs(Pe - Ps)/Pe$$
$$= Vs \cdot Pd/Pe$$
$$= C \cdot Pd$$

where C=Vs/Pe and C is constant.

In actuality, in a range where the leakage amount Leak is small, there is only a slight difference between the final pressure Pe and the specified pressure Ps, thus Vs/Pe is substantially equal to Vs/Ps, and accordingly it is possible to set C=Vs/Ps which is decided by condition of the inner volume of the reference fluidic circuit and condition of the inner volume of the test fluidic circuit, and this constant C can be determined by experiments.

At step S12, the actual leakage amount "Leak" is obtained as a product of Pd detected by the differential pressure sensor 7 and the constant C obtained by experiments.

At step S13 when the leakage amount Leak exceeds a specified threshold value, the LED indicator LNO actuates to show a "defective" condition, or when the leakage amount Leak is under the specified thresh-old value, the LED indicator LOK actuates to show a "proper" condition.

At step 14, the electromagnetic valves 4, 5 and 6 are opened, the stepping motors 11 and 21 are returned to the initial positions, and by moving the pistons 13, 23a and 23b, the capacities of the cylinders 14, 24a and 24b are maximized to accommodate the maximum amounts of atmospheric air into the cylinders 14, 24a and 24b and the routine is finished. At this time, the test connection port 2 is under the condition that it has a sealing valve 3 as a test piece screwed therein, and after the test is started, the pressure can be increased quickly to the specified test pressure of Ps at the time shown in FIG. 3. The reason for having to wait for the elapse of stabilizing time at step S5 is that it is necessary to wait until the fluidic distortion, which is the cause of errors, is removed from the differential pressure detected by the differential pressure sensor, the fluidic distortion being caused by the distortion of the inner volumes of the reference fluidic circuit 1a and the reference connection port 1 and the test fluidic circuit 2a and the test connection port 2, which occurs when raising the fluid pressure from the detected value of the pressure sensor 8 to the specified value of Ps.

The leakage measuring apparatus according to this embodiment comprises first pressure supply means 10 for supplying the same fluid pressure to a test fluidic circuit including a fluidic circuit 2 and a test connection port 2 to be connected with a sealing valve 3 as an object under test, and also to a reference fluidic circuit including a reference fluidic circuit 1a and a reference connection port 1, valve means including electromagnetic valves 5 and 6 which independently open and close to supply and stop the fluid from the first pressure supply means 10 to the test fluidic circuit and the reference fluidic circuit, pressure detecting means including a pressure sensor 8 for detecting the fluid pressure supplied to the test fluidic circuit, second pressure supply means 20 for supplying the fluid to the test fluidic circuit to maintain the fluid pressure in the test fluidic circuit at a specified pressure of Ps according to a detected value of the pressure detecting means including the pressure sensor 8, and also supplying the reference fluidic circuit with the same amount of fluid as the amount of fluid supplied to the test fluidic circuit, and differential pressure detecting means including a differential pressure sensor 7 for detecting a fluid differential pressure between the test fluidic circuit and the reference fluidic circuit.

Under the arrangement as described above, the same fluid pressure is applied to the test fluidic circuit having a sealing valve 3 as an object to be measured connected thereto and also to the reference fluidic circuit from the first pressure supply means 10. When the fluidic circuits are under the fluid pressure of Ps, the communication of the respective fluidic circuits with the first pressure supply means 10 is broken off independently of each other by using valve means including the electromagnetic valves 5 and 6, the fluid pressure supplied to the test fluidic circuit is detected by the pressure detecting means including the pressure sensor 8. According to the detected value of the pressure detecting means, the fluid is supplied to the test fluidic circuit by the second pressure supply means 20 in order to maintain the fluid pressure in the test fluidic circuit at the specified pressure of Ps. At the same time, the same amount of fluid as the amount supplied to the test fluidic circuit is also supplied to the reference fluidic circuit. Then, a differential pressure between the test fluidic circuit and the reference fluidic circuit is detected by the differential pressure detecting means including the differential pressure sensor 7, thereby deciding whether the sealing valve 3 is defective.

Therefore, for the purpose of detecting a defective object consisting of a sealing valve 3, the second pressure supply means 20 supplies the fluid to the test fluidic circuit in order to maintain the fluid pressure in the test fluidic circuit at the specified pressure of Ps and, at the same time, supplies the same amount of fluid as the above-mentioned supplied amount to the reference fluidic circuit, and then the differential pressure detecting means formed by the pressure sensor 7 detects a differential pressure of the fluid between the test fluidic circuit and the reference fluidic circuit. Therefore, if the sensitivity in detection of the differential pressure detecting means including the differential pressure sensor 7 is enhanced, the accuracy of the apparatus is improved.

In one aspect of the invention, the first pressure supply means 10 provides the same fluid pressure to the test fluidic circuit including a sealing valve 3 as a test piece and to the reference fluidic circuit serving as the reference standard, and the second pressure supply means 20 replenishes an amount of the fluid corresponding to the amount of leakage to both fluidic circuits. Therefore, the first pressure supply means 10 can be selected to have a greater capacity so as to raise the fluid pressure in the test fluidic circuit more rapidly and in the reference fluidic circuit, to raise the specified pressure of Ps at which the test is performed, in order to obtain a rapid start-up of the test resulting in a shorter testing time period.

Incidentally, as mentioned above, the apparatus of the invention requires a test fluidic circuit to be connected with a sealing valve 3 as a test piece subject to leak measurement and a reference fluidic circuit to be a reference standard. In this aspect, it is sufficient for embodying the present invention to form the test fluidic circuit and the reference fluidic circuit to have substantially equal inner volumes.

The first pressure supply means 10 in the above-mentioned embodiment comprises a stepping motor 11, a ball screw 12, a piston 13, and a cylinder 14. In putting the present invention into application, the first pressure supply means 10 may be any means capable of supplying a specified pressure, and therefore a pressure pump or a pressure cylinder or the like may be used.

Figure 4:
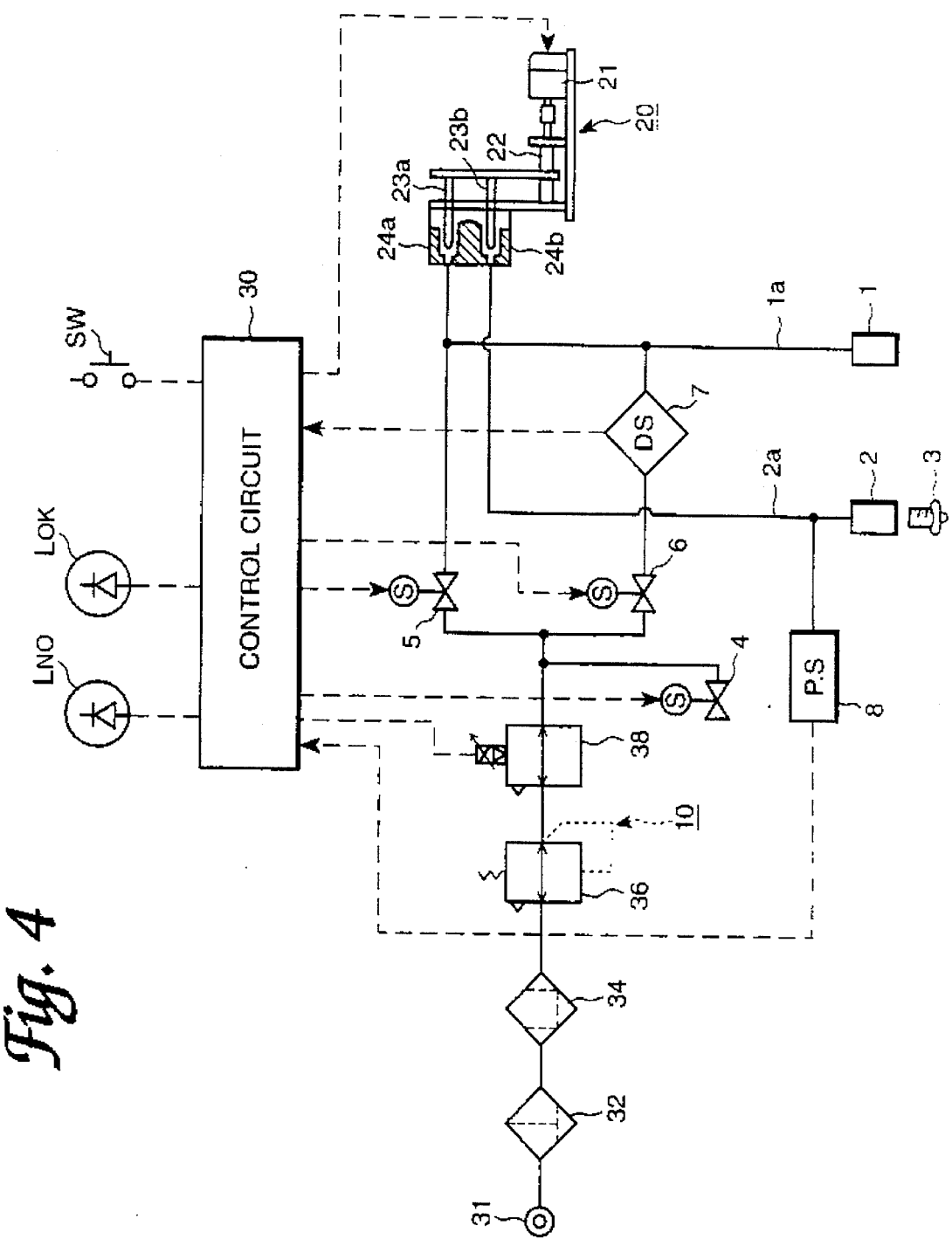
FIG. 4 is a circuit diagram showing the leakage measuring apparatus according to another embodiment of the present invention.

The first pressure supply means 10 may be a pressure controller 38 connected to a compressed air source 31. FIG. 4 is a circuit diagram showing the leakage measuring apparatus according to another embodiment of the present invention, which uses the pressure controller 38 as the first pressure supply means. The compressed air supplied from the compressed air source 31 is filtered to remove foreign matters by an air filter 32, and further filtered to remove oil contents by an oil filter 34. The compressed air is adjusted by a pressure reducing valve 36 to a specified adequate pressure and supplied to the pressure controller 38 where the compressed air is controlled remotely to a target pressure, and supplied through the electro-magnetic valves 5 and 6 to the fluidic circuits 1a and 2a. The construction excluding those parts mentioned in this embodiment is the same as that in the earlier-mentioned embodiment.

According to this latter embodiment, since the amount of fluid supplied is large, air can be pressurized more quickly than by the cylinder mentioned above. The difference in replenishing time resulting from the difference in the inner volumes of the fluidic circuits can be ignored.

Although the second pressure supply means 20 in the earlier-mentioned embodiment comprises a stepping motor 21, a ball screw 22, pistons 23a and 23b, and cylinders 24a and 24b, in putting the present invention into practical application, the second pressure supply means 20 may be any means capable of supplying a specified pressure and, therefore, a pressure pump or a pressure cylinder or the like may be used. It is also possible to omit the first pressure supply means 10 and use only the second pressure supply means 20 in such a way as to supply the same pressure to the test fluidic circuit 2a and the reference fluidic circuit 1a. In this case, a valve is installed to communicate between the test fluidic circuit 2a and the reference fluidic circuit 1a to equalize the fluid pressure in the two fluidic circuits and cut-off the communication so as to make the two fluidic circuits independent.

Further, the valve means in the above embodiments comprises two electromagnetic valves 5 and 6 which open and close independently to supply and stop the fluid from the first pressure supply means 10 to the test fluidic circuit and the reference fluidic circuit. However, in a concrete application of the present invention, a single valve may be used to communicate and cut-off between the test fluidic circuit and the reference fluidic circuit instead of the two valves.

Further, the pressure sensor 8 for detecting the fluid pressure in the test fluidic circuit in the above embodiments may be a well-known pressure sensor.

In addition, the differential pressure sensor 7 for detecting the differential pressure between the test fluidic circuit and the reference fluidic circuit may be a well-known differential pressure sensor.

As has been described, the leakage measuring apparatus according to the present invention supplies the same fluid pressure to the test fluidic circuit holding an object under leak test connected thereto and also to the reference fluidic circuit serving as the reference standard by the first pressure supply means, and cuts off the communication between the two fluidic circuits and the first pressure supply means by the valve means independently of each other while the two circuits are under the same fluid pressure, then detects the pressure of the fluid supplied to the test fluidic circuit by the pressure detecting means, supplies the fluid to the test fluidic circuit by the second pressure supply means in order to maintain the fluid pressure in the test fluidic circuit at a specified value according to the detected value of the pressure detecting means, and supplies the same amount of fluid as the amount supplied to the test fluid circuit to the reference fluid circuit. According to the differential pressure between the test fluidic circuit and the reference fluidic circuit detected by the differential pressure detecting means, a decision is made whether the object under leak test is proper or not.

Therefore, in order to detect a defective object under test, the second pressure supply means supplies fluid to the test fluidic circuit so as to maintain the fluid pressure in the test fluidic circuit at the specified pressure and supplies to the reference fluidic circuit, at the same time, the same amount of fluid as the amount supplied to the test fluidic circuit. Then, the differential pressure detecting means detects a differential pressure between the test fluidic circuit and the reference fluidic circuit. Therefore, if the sensitivity of the differential pressure detecting means is enhanced, the detection accuracy of the apparatus can be improved.

Further, since the first pressure supply means is used to supply the same fluid pressure to the test fluidic circuit to be connected with an object under leak test and the reference fluidic circuit, and the second pressure supply means is used to replenish an amount of the fluid corresponding to the amount of leakage, the fluid pressure in the test fluidic circuit and the reference fluidic circuit can be raised to a specified test pressure quickly, and accordingly, the test can be done in a short time.

We claim:

1. A leakage measuring apparatus comprising:

a test fluidic circuit with a connection port constructed and arranged to connect with an object under leakage measurement test;

a reference fluidic circuit;

pressure supply means in fluid communication with said test fluidic circuit and said reference fluidic circuit for supplying fluid to said test fluidic circuit and said reference fluidic circuit;

fluid metering means in fluid communication with both said test fluidic circuit and said reference fluidic circuit for delivering a precisely known, repeatable amount of fluid into said test fluidic circuit and said reference fluidic circuit;

valve means for cutting-off fluid communication with said test fluidic circuit and said reference fluidic circuit so as to make said fluidic circuits independent of each other;

pressure detecting means for detecting a pressure of said test fluidic circuit and outputting a pressure signal corresponding to a detected pressure;

differential pressure detecting means for detecting a differential pressure between said test fluidic circuit and said reference fluidic circuit and outputting a differential pressure signal corresponding to a detected differential pressure; and a control circuit with means for receiving said pressure signal and said differential pressure signal and for controlling said pressure supply means and said valve means, wherein when the object under leakage measurement test is connected to the test fluidic circuit, said control circuit (1) controls said pressure supply means to supply fluid to said test fluidic circuit and to said reference fluidic circuit to set said fluidic circuits at substantially equal pressures, (2) controls said valve means to make said test fluidic circuit and said reference fluidic circuit mutually independent, (3) controls, in response to said pressure signal, said pressure supply means and said fluid metering means to supply said test fluidic circuit with a first amount of fluid so as to maintain said pressure at a specified value and, generally at the same time, (4) controls said pressure supply means and said fluid metering means that supplies said reference fluidic circuit with an amount of fluid substantially equal to said first amount of fluid, and (5) detects and reports an amount of leakage of the object under leakage measurement test based on said differential pressure signal received, and wherein the amount of leakage from the object under test is directly proportional to the differential pressure signal received from said differential pressure detecting means.

2. A leakage measuring apparatus according to claim 1, wherein said pressure supply means comprises a stepping motor, a ball screw connected directly to said stepping motor, at least one piston capable of making reciprocating motions by rotating said ball screw, and at least one cylinder whose capacity is varied by the reciprocating motions of said piston.

3. A leakage measuring apparatus according to claim 1, wherein said pressure supply means includes:

a first pressure supply device for supplying fluid at said generally equal pressures to said test fluidic circuit and said reference fluidic circuit; and a second pressure supply device for supplying generally equal amounts of fluid to said test fluidic circuit and said reference fluidic circuit, wherein said valve means includes a valve for cutting-off fluid communication between said test fluidic circuit, said reference fluidic circuit and said first pressure supply device.

4. A leakage measuring apparatus according to claim 3, wherein said first pressure supply device comprises a stepping motor, a ball screw directly connected to said stepping motor, a piston making reciprocation motions by rotating said ball screw, and a cylinder whose capacity is varied by the reciprocating motions of said piston, wherein said second pressure supply device comprises a second stepping motor, a second ball screw directly connected to said second stepping motor, a pair of pistons making reciprocating motions by rotating said second ball screw, and a pair of cylinders whose capacities are varied by the reciprocating motions of said pair of pistons, and wherein a generally equal amount of fluid is supplied by said respective cylinders to said fluidic circuits.

5. A leakage measuring apparatus according to claim 3, wherein said first pressure supply device is a pressure controller connected to a compressed air source.

6. A leakage measuring apparatus according to claim 1, wherein said pressures are equal pressures within a tolerance of plus or minus 10 millimeters Hg, and said amounts of fluid supplied to said reference circuit is an amount of fluid equal to said first amount of fluid within a tolerance of 3 milliliters.

7. A leakage measuring apparatus according to claim 1, wherein said amount of leakage from the object under test is defined by the parameter "leak" which represents the actual amount of the volume leakage occuring during a predetermined test time "T", wherein an inner volume "Vs" of said reference fluidic circuit, an amount of leakage "L" measured during a test time "T" and an actual amount of volume leakage "Leak" during the test time "T" and a compressed volume "v" due to disturbances is determined and the differential pressure "Pd" detected by said detecting means is known, a final pressure Pe is measured and a specified pressure Ps is defined whereby, the following relationship is established:

$$(Ps)(Vs) = Pe(Vs - L - V)$$

$$\text{Leak} = v + L = Vs(Pe - Ps)/Pe$$
$$= (Vs)Pd/Pe$$
$$= (C)Pd$$

where C=Vs/Pe, and C is constant.

* * * * *